United States Patent
Blansette

(10) Patent No.: US 12,410,829 B2
(45) Date of Patent: Sep. 9, 2025

(54) UNITARY BRACKET FOR T-SLOTTED RAILS

(71) Applicant: Intelligent Systems, Carmel, IN (US)

(72) Inventor: Stephe Blansette, Carmel, IN (US)

(73) Assignee: Intelligent Systems Mobile, Carmel, IN (US)

( * ) Notice: Subject to any disclaimer, the term of this patent is extended or adjusted under 35 U.S.C. 154(b) by 211 days.

(21) Appl. No.: 18/311,943

(22) Filed: May 4, 2023

(65) Prior Publication Data

US 2024/0369094 A1   Nov. 7, 2024

(51) Int. Cl.
  *F16M 13/00*   (2006.01)
  *F16B 37/04*   (2006.01)

(52) U.S. Cl.
  CPC ................... *F16B 37/045* (2013.01)

(58) Field of Classification Search
  CPC ..................................... F16B 37/045
  See application file for complete search history.

(56) References Cited

U.S. PATENT DOCUMENTS

| | | | | |
|---|---|---|---|---|
| 6,827,531 | B2 * | 12/2004 | Womack | B60P 7/0815 410/104 |
| 10,173,484 | B2 * | 1/2019 | McCoy | B60D 1/488 |
| 2014/0061412 | A1 * | 3/2014 | Suzuki | F16B 37/02 248/226.11 |
| 2014/0175240 | A1 * | 6/2014 | Selzer | E04B 7/163 49/82.1 |
| 2021/0388938 | A1 * | 12/2021 | Vilhelmsen | F16B 7/0493 |

* cited by examiner

*Primary Examiner* — Amy J. Sterling
(74) *Attorney, Agent, or Firm* — David E. Novak; Brannon Sowers & Cracraft PC

(57) ABSTRACT

A bracket assembly, including a unitary bracket portion defining a middle portion connected to oppositely disposed top and bottom portions, and a magnet portion operationally connected to the top portion. The top portion defines a front face, an oppositely disposed rear face, and a first plane. The rear face further defines a cradle portion for accepting the magnet portion. The bottom portion further defines a neck portion connected to the middle portion and an elongated wedge portion extending therefrom along a first major axis. The first major axis is oriented orthogonally with the first plane. A threaded bore may be formed through the front face for threadedly accepting a threaded connection member extending through the magnet portion for affixing the magnet portion to the top portion. A bore may be formed through the wedge portion and extend into the neck portion for accepting a reinforcing member.

14 Claims, 6 Drawing Sheets

UNITARY BRACKET FOR T-SLOTTED RAILS

BACKGROUND

Structural support members, such as T-slotted aluminum rails or extrusions, are very versatile and as such are ubiquitous in home and industrial applications. The T-slotted members connect to walls, vehicles, and the like via mounting brackets, which are usually formed to have a pair of intersecting flat surfaces defining a right angle, with apertures formed in both surfaces through which a bolt or screw may be extended. The bracket connects to the T-slotted member buy extending through the slot and into a typically wedge-shaped nut to anchor the bracket into the T-slotted member while allowing the bracket to be slid along the slot into a desired position and then tightened down to prevent further movement.

While useful, this bracket system still has several drawbacks. For example, each bracket requires a pair of bolts or screws and at least one nut to function. For larger construction projects, the number of brackets, bolts and nuts presents a logistics problem, as the worker must keep track of a large number of small pieces. Further, having to insert the bolt through the bracket and into the nut, move the bracket into position, tighten the bolt and nut to anchor the bracket, and then bolt the bracket onto the desired work surface presents a number of fine operations for each and every bracket, wasting time and inviting error. Thus, there remains a need for an improved bracket system for connecting T-slotted and like structural members. The present novel technology addresses this need.

BRIEF DESCRIPTION OF THE DRAWINGS

The embodiment and other features, advantages and disclosures contained herein, and the manner of attaining them, will become apparent and the present disclosure will be better understood by reference of the following description of various examples of the present disclosure taken in conjunction with the accompanying drawings, wherein.

DETAILED DESCRIPTION

Figure 1:
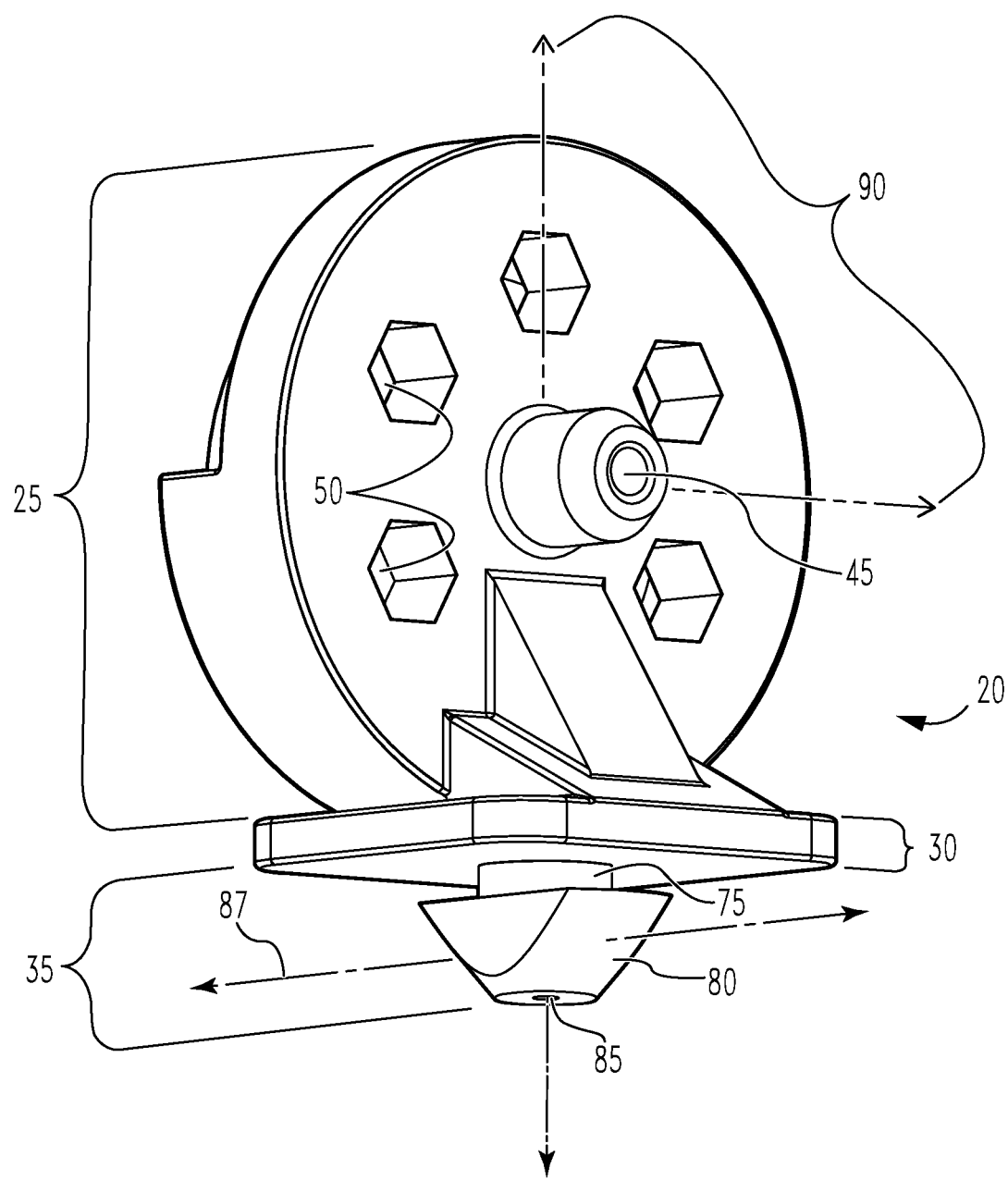
FIG. 1. is a first perspective view of a first embodiment of as unitary bracket system of the present novel technology.
Figure 2:
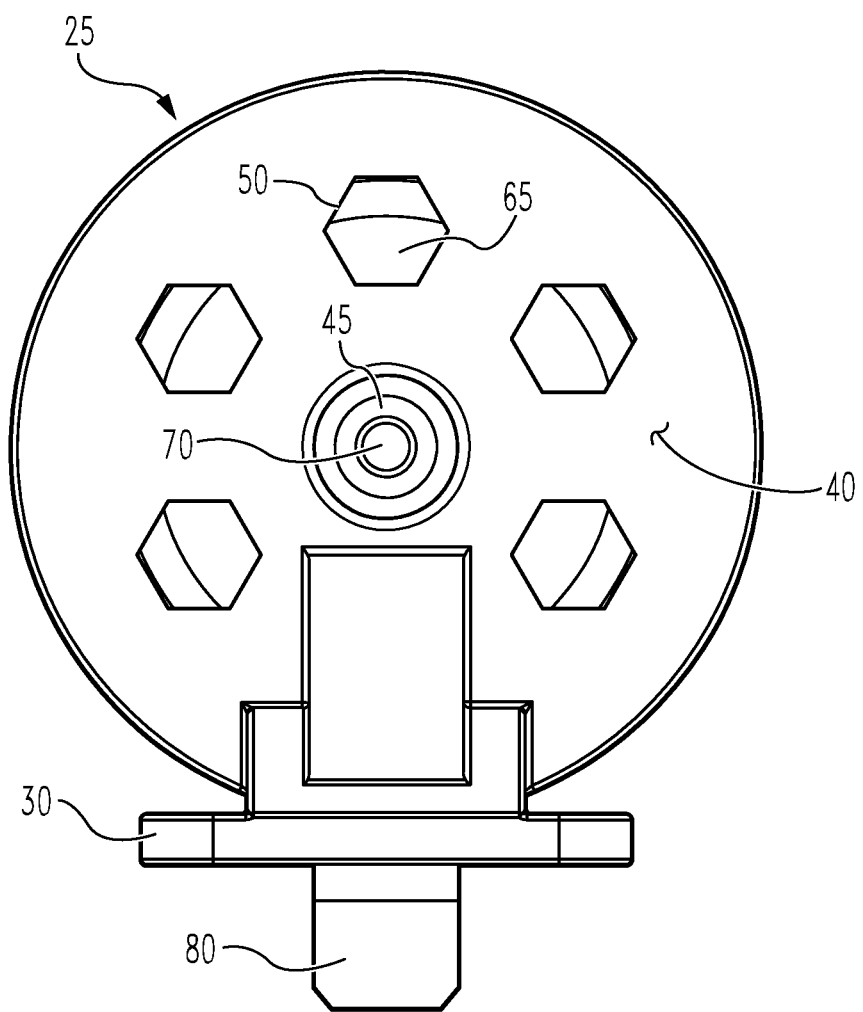
FIG. 2 is a second perspective view of the embodiment of FIG. 1.
Figure 3:
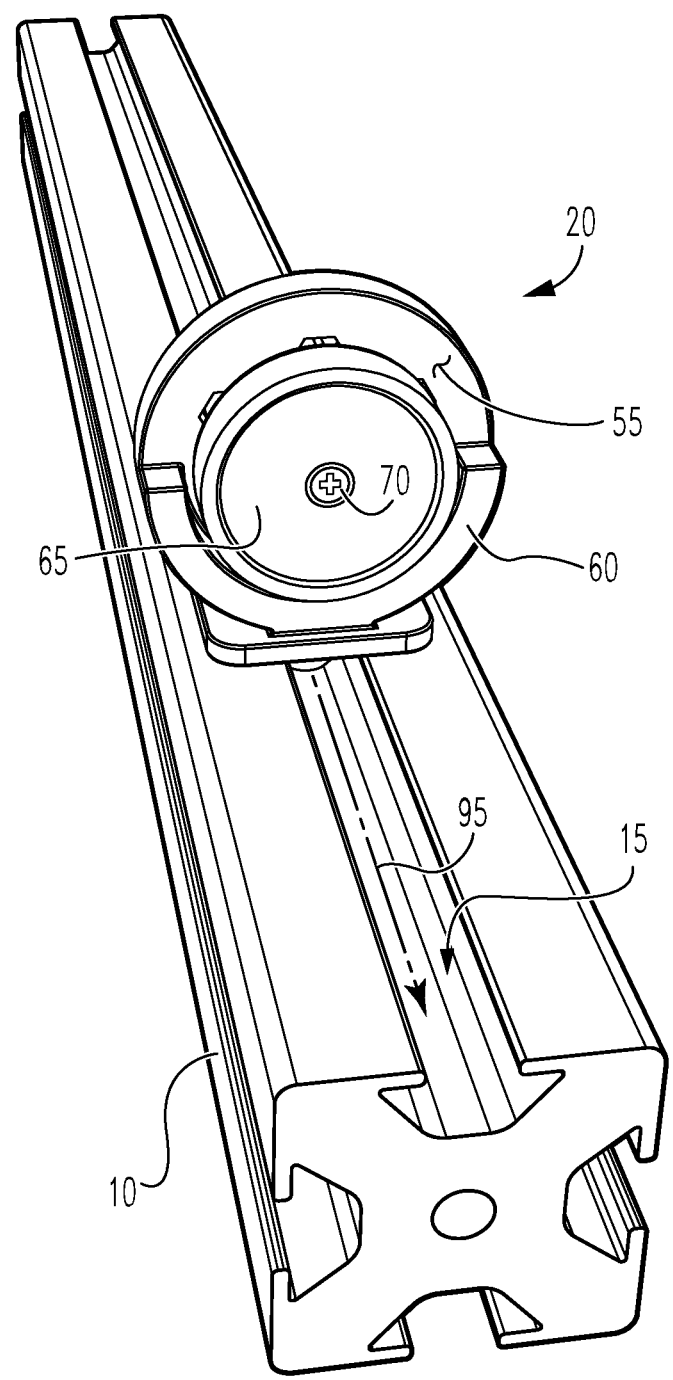
FIG. 3 is a third perspective view of the embodiment of FIG. 1 as slidingly engaged to a T-slotted member.
Figure 4:
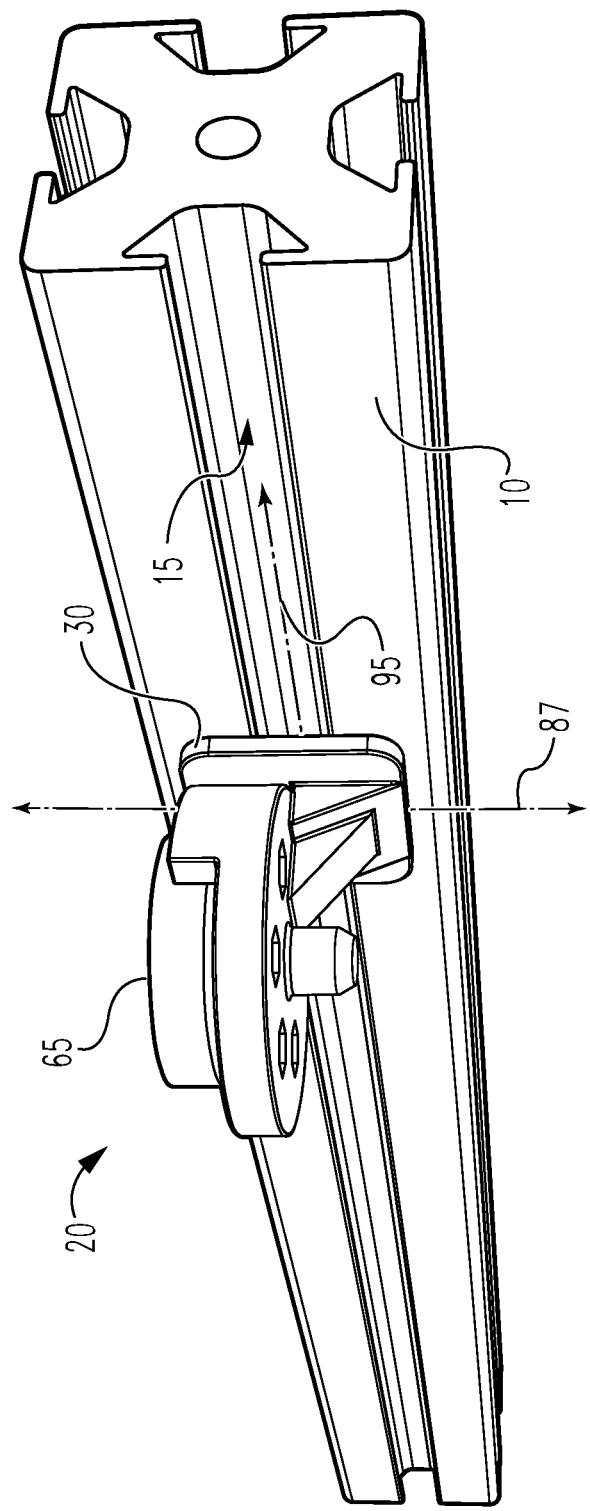
FIG. 4 is a fourth perspective view of the embodiment of FIG. 1 as fixedly engaged to a T-slotted member.
Figure 5:
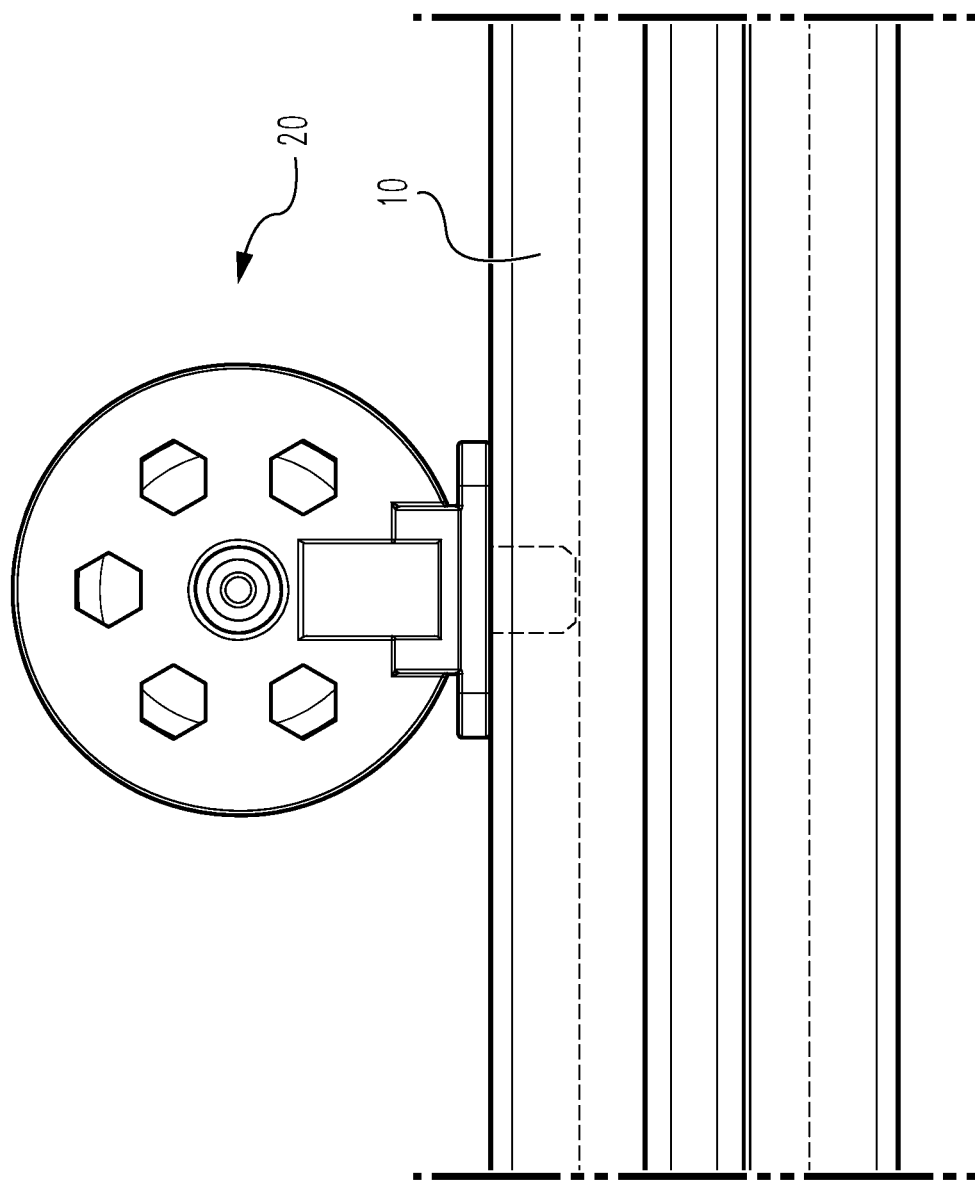
FIG. 5 is a front elevation view of the embodiment of FIG. 4 showing the middle portion of the bracket system flushingly engaged with an elongated T-slotted member.
Figure 6:
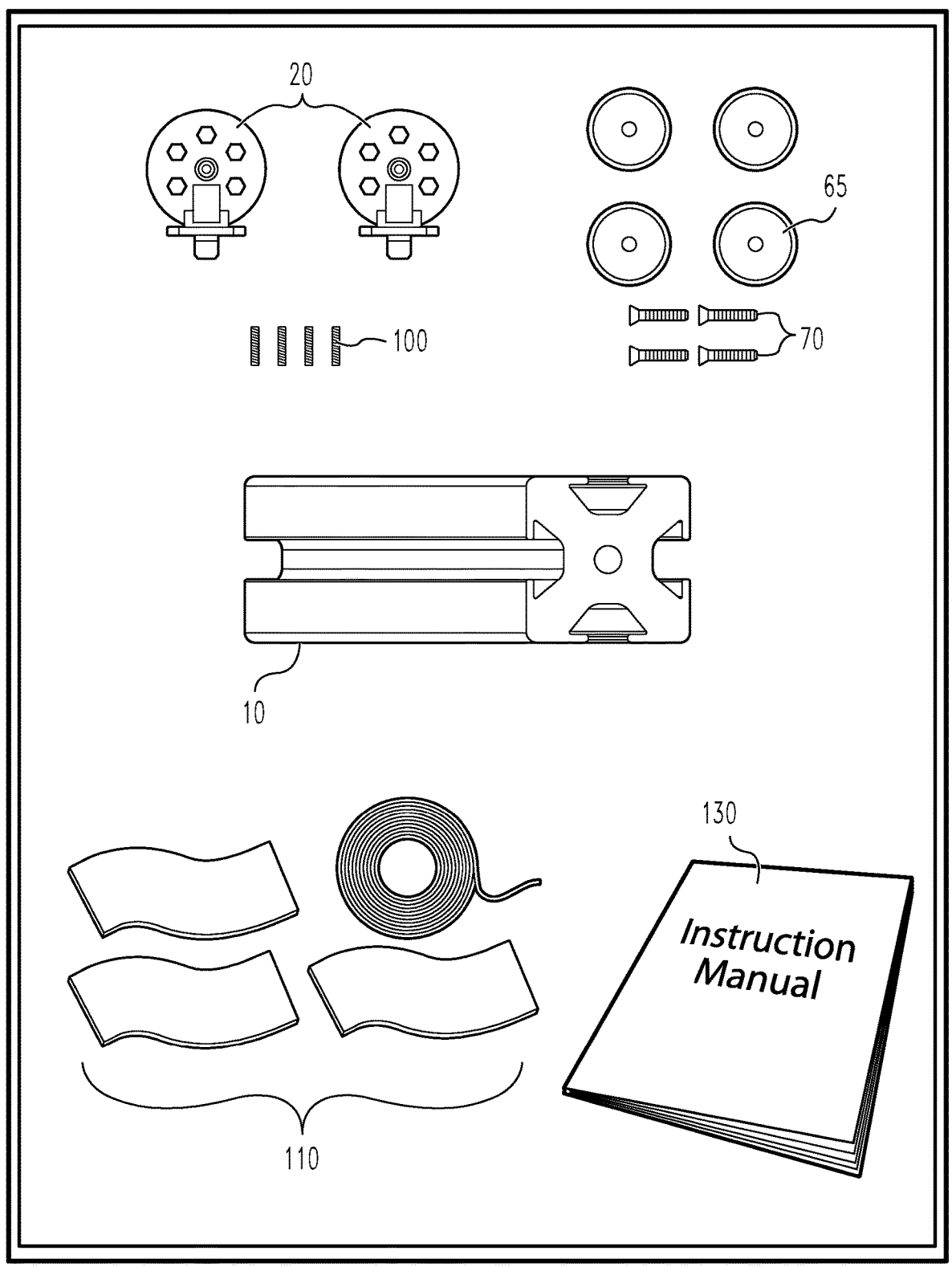
FIG. 6 schematically illustrates a unitary flange system kit according to another embodiment of the present novel technology.

Before the present methods, implementations, final and intermediate compositions, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance may occur often, although there may be circumstances where it may not occur, and that the description includes instances where said event or circumstance occurs and instances where it does not.

In residential, commercial, and/or industrial environments, lightweight T-slotted or like structural members 10 provide an efficient and economical solution to construction needs. Traditionally, such members are connected to work surfaces such as walls, furniture, vehicles, and the like by slotted brackets using screw and nut sets or like threaded fasteners. The present novel technology relates to a bracket member 20 (also called bracket assembly herein) having a unitary bracket portion 23 including a top portion 25, a middle portion 30, and a bottom portion 35.

The top portion 25 further includes a front face 40 which may have a central threaded bore 45 extending therethrough. Front face 40 typically includes a plurality of recesses or apertures 50 formed therethrough as a means for saving material, reducing weight, providing vibration mitigation and damping, and increasing production efficiency and economy. Oppositely disposed rear face 55 typically includes a cradle portion 60 for holding a magnet 65 therein. Magnet may be secured to top portion 25 such as be a screw or like fastener 70 threadedly engaged therewith and extending into threaded engagement with threaded bore 45, by an adhesive, or by any convenient means.

Middle portion 30 is typically a flat, generally planar, plate member connected to top and bottom portions 25, 35. Top portion extends directly from middle portion 30, while bottom portion 35 includes a neck 75 connected to middle portion 30 and an elongated wedge 80 is connected to neck 75. Elongated wedge 80 is sized, shaped, and oriented to slidingly engage slot 15 when top portion is oriented to face the direction of the slot 15, and to lockingly engage the T-slotted member 10 when bracket 20 is rotated ninety degrees such that top portion 25 is oriented to face away from the direction of the slot 15. Elongated wedge member 80 is elongated in the direction defining wedge major axis 87, which is oriented orthogonally to plane 90 defined by the top portion 25. In other words, when the plane 90 defined by the top portion 25 is oriented perpendicular to the major axis 95 of the elongated T-slotted member 10, major axes 87 and 95 are parallel and bracket 20 may freely slide along the slot 15, but when the plane 90 defined by the top portion 25 is oriented parallel to the major axis 95 of the elongated T-slotted member 10, major axes 87 and 95 are perpendicular to one another and bracket 20 is locked or anchored in place by the engagement interaction of the wedge member 80 and the T-slotted member 10.

Wedge portion 80 may further include a central (typically threaded) bore 85 extending therethrough and into the neck 75 into which a (typically threaded) support member or pin 100 may be inserted.

Unitary bracket portion 23 may be made of any lightweight material, such as plastic, composite materials such as carbon fiber composite, aluminum, or the like. In some embodiments, unitary bracket member 23 is sufficiently flexible and/or pliable to provide damping to vibration; in other words, unitary bracket member 23 has a sufficiently great spring constant to be an effective damper. Spring constant defined by unitary bracket member 23 is typically at least about 8 kN/m, more typically at least about 10 kN/m, and still more typically about 12 kN/m. In one embodiment, bracket portion 23 is three-dimensionally printed and made of polymer precursors, with magnet portion 65 being a neodymium rare earth disk magnet.

In some embodiments, rear face 55 is provided generally flat and without cradle potion 60; instead of via magnet 65, rear face 55 is affixed/affixable to work surface via an adhesive or like fastening means.

In some embodiments, ferromagnetic tape 110 is applied to diamagnetic surfaces, such as wood or plastic, to enable the magnet portion 65 to magnetically affix to the otherwise non-magnetic surface.

In operation, bracket assembly 20 is oriented such that axes 95 and 87 are parallel, and bracket assembly 20 is slidingly engaged with a T-slotted member 10 and positioned therewith as desired. When the bracket assembly is so positioned relative to the T-slotted member 10, bracket assembly is reoriented or pivoted such that magnet portion 65 is parallel to and flush with a ferromagnetic mounting surface and axes 87 and 95 are perpendicular to one another. Wedge member 80 is now lockingly engaged with T-slotted member 10, preventing further movement of the bracket assembly 20 relative to the same. Bracket assembly 20 may be repositioned relative to, or removed from, T-slotted member 10 by disengaging magnet 65 from the ferromagnetic mounting surface (by supplying sufficient urging force away from the ferromagnetic surface to overcome the magnetic attraction therebetween) and pivoting the bracket assembly to reorient the axes 87, 95 such that they are once again parallel, allowing the bracket assembly 20 to slide within the slot 15.

In some embodiments, the components of the system 20 are provided as a kit 125. The kit 125 may typically include separately provided elements such as one or more, and typically a plurality of, bracket members 23, one or more, and typically a plurality of, disc magnet members 65, one or more, and typically a plurality of, fasteners 70, one or more, and typically a plurality of, pins 100, and/or one or more, and typically a plurality of, lengths of ferromagnetic tape 110, as well as an instruction manual 130 for directing an end user as to how to install, engage, and/or use the system 20 with T-slotted Or like members 10 and/or how to build support structures using the same 10, which may likewise be included in the kit 125.

Thus, while the disclosure has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A bracket assembly, comprising:
   a unitary bracket portion defining a middle portion connected to oppositely disposed top and bottom portions; and
   a magnet portion operationally connected to the top portion;
   wherein the top portion defines a front face, an oppositely disposed rear face, and a first plane;
   wherein the rear face further defines a cradle portion for accepting the magnet portion;
   wherein the bottom portion further defines a neck portion connected to the middle portion and an elongated wedge portion extending therefrom along a first major axis; and
   wherein the first major axis is oriented orthogonally with the first plane.

2. The bracket assembly of claim 1 and further comprising a threaded bore formed through the front face for threadedly accepting a threaded connection member extending through the magnet portion for affixing the magnet portion to the top portion.

3. The bracket assembly of claim 1 and further comprising a bore formed through the wedge portion and extending into the neck portion for accepting a reinforcing member.

4. The bracket assembly of claim 1 wherein the wedge portion is sized to slidingly engage an elongated slot of a T-slotted support member when the first major axis is aligned parallel with a second major axis defined by the elongated slot and wherein the wherein the wedge portion is sized to lockingly engage the T-slotted support member when the first major axis is aligned perpendicular to the second major axis.

5. The bracket assembly of claim 1 wherein the front face includes a plurality of apertures formed therethrough.

6. The bracket assembly of claim 1 wherein the middle portion is a generally planar plate oriented to flushingly engage a T-slotted member.

7. A kit, comprising:
   a plurality of bracket members;
   a plurality of disc magnet members;
   a plurality of fasteners;
   a plurality of support pins; and
   an instruction manual.

8. The kit of claim 7 and further comprising a length of ferromagnetic tape.

9. The kit of claim 7, and further comprising a plurality of T-slotted members.

10. A bracket system, comprising:
    a unitary bracket portion defining a middle portion connected to oppositely disposed top and bottom portions; and
    a work surface connection portion operationally connected to the top portion;
    wherein the unitary bracket portion has a spring constant of at least 8 kN/m;
    wherein the top portion defines a front face, an oppositely disposed rear face, and a first plane;
    wherein the bottom portion further defines a neck portion connected to the middle portion and an elongated wedge portion extending therefrom along a first major axis;

wherein a reinforcing pin extends through the neck portion; and wherein the first major axis is oriented orthogonally with the first plane.

11. The bracket system of claim 10 wherein the work surface connection portion is a disc magnet operationally connected to the rear face.

12. The bracket system of claim 10 wherein the work surface connection portion is an adhesive operationally connected to the rear face.

13. The bracket system of claim 10 wherein the unitary bracket portion has a spring constant of at least 12 kN/m.

14. The bracket system of claim 10 wherein the unitary bracket portion has a spring constant of at least 10 kN/m.

\* \* \* \* \*